US010852827B1

(12) United States Patent
Bochereau et al.

(10) Patent No.: US 10,852,827 B1
(45) Date of Patent: Dec. 1, 2020

(54) TACTILE SIMULATION OF INITIAL CONTACT WITH VIRTUAL OBJECTS

(71) Applicant: Facebook Technologies, LLC, Menlo Park, CA (US)

(72) Inventors: Serena Bochereau, Seattle, WA (US); Jonathan Browder, Seattle, WA (US); Femke van Beek, Redmond, WA (US); Raymond King, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/362,935

(22) Filed: Mar. 25, 2019

(51) Int. Cl.
*G06F 3/01* (2006.01)
*G08B 6/00* (2006.01)

(52) U.S. Cl.
CPC ............. *G06F 3/014* (2013.01); *G08B 6/00* (2013.01)

(58) Field of Classification Search
CPC .................................. G06F 3/014; G08B 6/00
See application file for complete search history.

(56) References Cited

U.S. PATENT DOCUMENTS

| 5,583,478 | A | 12/1996 | Renzi |
| 5,986,643 | A | 11/1999 | Harvill et al. |
| 9,857,874 | B2 | 1/2018 | Wang et al. |
| 2009/0177452 | A1 | 7/2009 | Ullrich et al. |
| 2014/0198130 | A1 | 7/2014 | Lacroix |
| 2016/0147304 | A1 | 5/2016 | Lund et al. |
| 2016/0259408 | A1 | 9/2016 | Messingher et al. |
| 2016/0274662 | A1 | 9/2016 | Rimon et al. |
| 2016/0342202 | A1 | 11/2016 | Kang et al. |
| 2016/0363997 | A1 | 12/2016 | Black et al. |

(Continued)

FOREIGN PATENT DOCUMENTS

| WO | 2016/029183 A1 | 2/2016 |
| WO | 2016/186932 A1 | 11/2016 |

OTHER PUBLICATIONS

Okamura et al., "Vibration Feedback Models for Virtual Environments", IEEE International Conference on Robotics and Automation, May 16-20, 1998, pp. 1-6.

(Continued)

*Primary Examiner* — Brian A Zimmerman
*Assistant Examiner* — Kevin Lau
(74) *Attorney, Agent, or Firm* — FisherBroyles, LLP

(57) ABSTRACT

The disclosed computer-implemented method may include (1) presenting, using a vibrotactile stimulator and a visual display, an artificial environment to a user, (2) determining whether a virtual contact is being initiated between a virtual object in the artificial environment and a surface location of the user served by the vibrotactile stimulator, and (3) actuating, in response to determining that a virtual contact is being initiated between the virtual object and the surface location, the vibrotactile stimulator to generate a vibrotactile signal to simulate initiation of the virtual contact at the surface location, where (a) the vibrotactile signal includes a magnitude-varying signal, and (b) at least one parameter of the magnitude-varying signal is based on a simulated rigidity of the virtual object as presented by the visual display. Various other methods, systems, and computer-readable media are also disclosed.

20 Claims, 10 Drawing Sheets

(56) References Cited

U.S. PATENT DOCUMENTS

2017/0212589 A1* 7/2017 Domenikos ............ G06F 3/0346
2018/0164885 A1* 6/2018 Cruz-Hernandez ..... G06F 3/016
2019/0155387 A1* 5/2019 Saboune ................. G06F 3/016
2019/0391647 A1* 12/2019 Rihn ........................ G06F 3/017

OTHER PUBLICATIONS

Wu et al., "Visual, Haptic, and Bimodal Perception of Size and Stiffness in Virtual Environments", Proceedings of the ASME Dynamic Systems and Control Division, vol. 67, Jan. 1, 1999, pp. 19-26.

Okamura et al., "Reality-Based Models for Vibration Feedback in Virtual Environments", IEEE/ASME Transactions on Mechatronics, vol. 6, No. 3, Sep. 1, 2001, pp. 245-252.

Hwang et al., "Toward Event-Based Haptics: Rendering Contact Using Open-Loop Force Pulses", 12th International Symposium on Haptic Interfaces for Virtual Environment and Teleoperator Systems, Jan. 1, 2004, 8 pages.

Kuchenbecker et al., "Event-Based Haptics and Acceleration Matching: Portraying and Assessing the Realism of contact", First Joint Eurohaptics Conference and Symposium on Haptic Interfaces for Virtual Environment and Teleoperator Systems, Mar. 18-20, 2005, 9 pages.

Kuchenbecker et al., "Improving Contact Realism through Event-Based Haptic Feedback", IEEE Transactions on Visualization and Computer Graphics, vol. 12, No. 2, Mar./Apr. 2006, pp. 219-230.

Kuchenbecker et al., "The Touch Thimble: Providing Fingertip Contact Feedback During Point-Force Haptic Interaction", Proceedings of Symposium on Haptic Interfaces for Virtual Environment and Teleoperator Systems, Jan. 1, 2008, 8 pages.

Gleeson et al., "Exploration of Tactile Contact in a Haptic Display: Effects of Contact Velocity and Transient Vibrations", IEEE Transactions on Haptics, Jan. 1, 2010, pp. 1-12.

Shao et al., "Spatial Patterns of Cutaneous Vibration During Whole-Hand Haptic Interactions", Proceedings of the National Academy of Sciences, Mar. 1, 2016, 11 pages.

* cited by examiner

TACTILE SIMULATION OF INITIAL CONTACT WITH VIRTUAL OBJECTS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
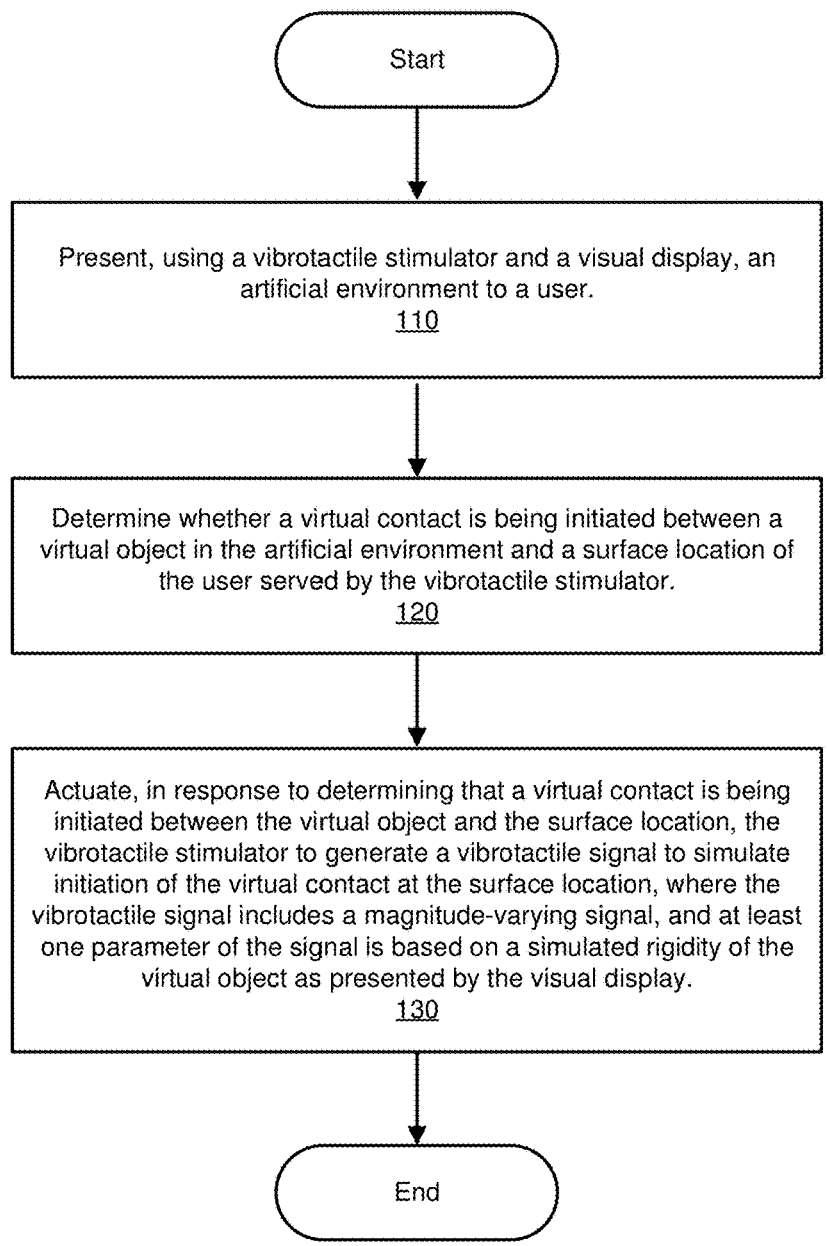
FIG. 1 is a flow diagram of an exemplary method for tactile simulation of initial contact with a virtual object.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Some artificial reality systems, such as virtual reality (VR) systems, augmented reality (AR) systems, mixed reality (MR) systems, and the like, present to a user perceptual information using multiple sensory modalities (e.g., light, sound, and so on) to provide an immersive or engaging artificial experience for the user. To present the perceptual information, AR systems may employ multiple types of physical hardware (e.g., visual displays, audio headphones, tactile gloves, etc.) to provide sensory information to the user according to signals representative of the perceptual information to generate the artificial environment for the user.

Some research conducted in the area of artificial reality has attempted to record vibrations actually imparted on human skin as a reaction to that skin coming in contact with a physical object, and then employ those recorded vibrations to drive a vibrotactile stimulator of an AR system in an attempt to duplicate the sensation of that contact. However, such efforts often do not result in a realistic experience for the user, especially when presented in conjunction with a visual representation of the initial contact of the user (e.g., the fingertips of the user) with the virtual object.

The present disclosure is generally directed to tactile simulation of initial user contact with virtual objects. As will be explained in greater detail below, embodiments of the instant disclosure may result in greater immersion or realism for the user in an artificial reality environment being presented to the user. In some examples, one or more characteristics of a signal driving a vibrotactile stimulator that provides the most realistic experience for the user may be influenced by a contemporaneous visual presentation of the user's virtual contact with the virtual object.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-10, detailed descriptions of various exemplary methods and systems for tactile simulation of initial contact with virtual objects, such as those presented in an artificial environment by way of an artificial reality system. A discussion of an exemplary method for such tactile simulation is provided in connection with FIG. 1. An exemplary system for tactile simulation is discussed in conjunction with FIG. 2, and exemplary user sensors employable therein are briefly mentioned in association with FIG. 3. A tactile glove that may be used in the system of FIG. 1 is described in association with FIG. 4, while a representation of the user's hand coming into contact with a virtual object is discussed in connection with FIG. 5. An exemplary vibrotactile signal provided via a vibrotactile stimulator is explained in conjunction with FIG. 6. User satisfaction as associated with various aspects of such a vibrotactile signal for a number of virtual objects of varying rigidity are discussed in association with FIG. 7. Finally, several exemplary artificial reality systems that may incorporate tactile simulation of initial contact with virtual objects are described in conjunction with FIGS. 8-10.

FIG. 1 is a flow diagram of an exemplary computer-implemented method 100 for tactile simulation of initial contact with a virtual object, such as that which may be performed by an artificial reality system. The steps shown in FIG. 1 may be performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

As illustrated in FIG. 1, at step 110, one or more of the systems described herein may present an artificial environment to a user using a visual display and a vibrotactile stimulator. In some embodiments, a vibrotactile stimulator may be a hardware transducer or other component that transforms an input signal (e.g., a sequence of digital values, or an electrical voltage or current signal) into a vibrotactile signal (e.g., a physical vibration or some other type of movement) that may be sensed by the user's skin and/or other part of the user's body. In some examples, one or more vibrotactile stimulators may be integrated into a tactile glove or other device that may be worn or otherwise engaged by the user. However, other vibrotactile stimulators may be positioned at other locations proximate the user's body (e.g., face, arms, torso, legs, etc.).

At step 120, the systems described herein may determine whether a virtual contact is being initiated between a virtual object in the artificial environment and a surface location of the user served by the vibrotactile stimulator. In some embodiments, this determination may be made by mapping or tracking the location of one or more portions of the user's body in relation to the location of one or more virtual objects being represented in the artificial environment to detect the initiation of contact therebetween in the artificial environment. In some examples, the surface location of the user served by the vibrotactile stimulator may be the surface location proximate, or making contact with, the vibrotactile stimulator, such as a fingertip of the user atop which a vibrotactile stimulator of a tactile glove is located.

At step 130, in response to determining that a virtual contact is being initiated between the virtual object and the surface location, one or more systems described herein may actuate the vibrotactile stimulator (e.g., using digital values, or an electrical voltage or current signal) to generate a vibrotactile signal to simulate initiation of the virtual contact. In some embodiments, the vibrotactile signal may include a magnitude-varying signal. For example, the vibrotactile signal may be a sinusoidal signal that decays (e.g., exponentially) over time, but other types of magnitude-varying signals may also serve as the vibrotactile signal.

Further, in some embodiments of method 100, at least one parameter of the vibrotactile signal may be based on a simulated rigidity of the virtual object as presented by the visual display. For example, for objects that appear rigid or hard (e.g., a wooden table) to the user via the visual display, one or more parameters of the vibrotactile signal (e.g., the rate of decay of the signal, the frequency of the signal, the initial amplitude of the signal, and so on) may be based on that rigidity, while objects that appear relatively less rigid or sturdy (e.g., a ping pong ball) to the user may cause one or more of the same parameters to be different to reflect the difference in simulated rigidity between those virtual objects.

Figure 2:
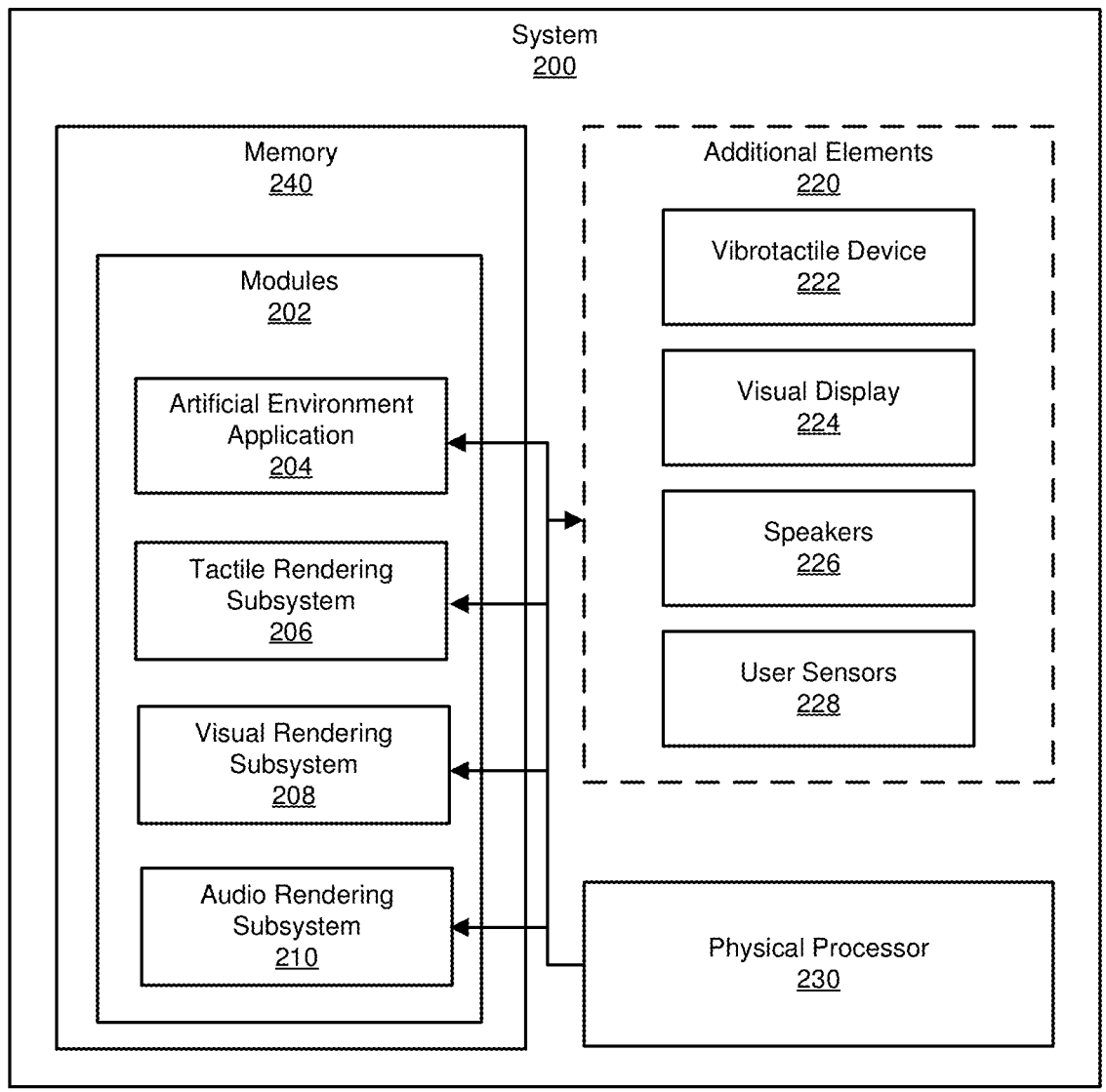
FIG. 2 is a block diagram of an exemplary system for tactile simulator of initial contact with a virtual object.

FIG. 2 is a block diagram of an exemplary system 200 (e.g., an artificial reality system) providing tactile simulation of initial contact with a virtual object. As illustrated in FIG. 2, system 200 may include at least one physical processor 230 (e.g., a microprocessor, microcontroller, or the like) in communication with a memory 240 storing one or more modules 202 that may include processor-readable instructions that, when executed by physical processor 230, may perform operations described in greater detail herein. In some embodiments, modules 202 may include an artificial environment application 204, along with a tactile rendering subsystem 206, a visual rendering subsystem 208, and/or an audio rendering subsystem 210. Also in communication with physical processor 230 may be additional elements 220, such as a vibrotactile device 222, a visual display 224, speakers 226, and/or user sensors 228. Other elements or modules may also be incorporated within system 200 in other embodiments, but such elements or modules are not described herein to simplify and focus the following discussion.

In some embodiments, artificial environment application 204 may be a program or other software that describes and presents at least a portion of a particular artificial environment to a user. To that end, artificial environment application 204 may employ one or more rendering subsystems (e.g., tactile rendering subsystem 206, visual rendering subsystem 208, and/or audio rendering subsystem 210) to track the environmental state of the artificial environment and render the artificial environment for presentation to the user (e.g., via vibrotactile device 222, visual display 224, and/or speakers 226, respectively). In addition, artificial environment application 204 may also communicate with user sensors 228 to determine a current state of a user (e.g., a location of one or more portions of the user), which may in turn alter the current environmental state of the artificial environment.

The functionality of each subsystem 206, 208, and 210 may be discerned by the names of those subsystems. More specifically, in some embodiments, tactile rendering subsystem 206 may generate input (e.g., one or more electrical voltage or current signals, one or more digital signals, and so on) for driving vibrotactile device 222 to provide tactile information to the user regarding the user's interaction with the artificial environment. Similarly, visual rendering subsystem 208 may generate input for driving visual display 224 to provide visual images to the user of the surrounding artificial environment, and audio rendering subsystem 210 may generate input for driving speakers 226 to provide sounds to the user corresponding to the artificial environment. In some examples, vibrotactile device 222 may include one or more tactile gloves or other types of clothing that may include one or more vibrotactile stimulators, as mentioned above. Various embodiments of visual displays 224 and speakers 226 may be incorporated into artificial reality systems, examples of which are discussed below in conjunction with FIGS. 8-10.

Figure 3:
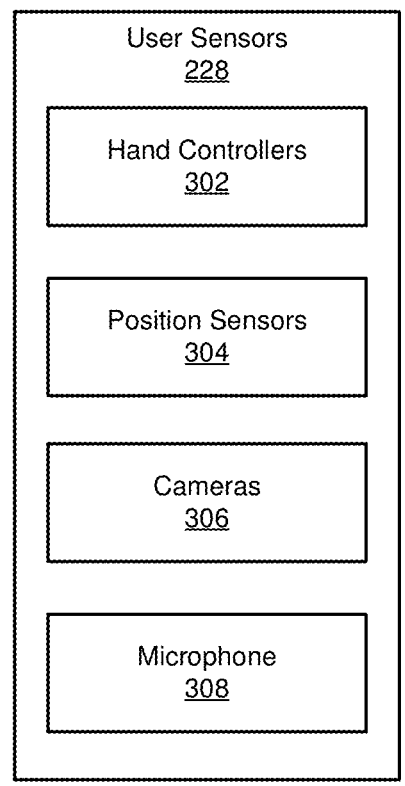
FIG. 3 is a block diagram of user sensors that may be employed in the exemplary system of FIG. 2.

FIG. 3 is a block diagram of user sensors 228 that may be employed in system 200 of FIG. 2. In the particular embodiment of FIG. 3, user sensors 228 may include hand controllers 302, position sensors 304, cameras 306, microphone 308, and/or the like. For example, hand controllers 302 may sense the position of the user's hands and/or fingers, thus interpreting actions or input from the user that may be employed to alter or influence the artificial environment being presented to the user. Also, in some examples, hand controllers 302 may include buttons, switches, or other input devices that the user may employ to provide specific types of input. In some embodiments, position sensors 304 may determine a position or orientation, as well as some aspects of movement, of particular portions of the user. Additionally, in some examples, position sensors 304 located at the head of the user may determine the orientation and/or other aspects of movement of the user's head, which may be employed to determine a particular viewpoint of the user within the artificial environment being presented to the user. One or more cameras 306 may capture images of the user that may be employed to determine the position, location, and/or orientation of one or more portions (e.g., arms, head, torso, and so on) of the user. In some embodiments, microphone 308 may sense user sounds (e.g., vocal commands) from the user. In other embodiments, other types of user sensors 228 may be employed aside from those described above. Additionally, in some examples, two or more user sensors 228, possible along with one or more other components of system 200, may be combined into a single device. For example, hand controllers 302 and vibrotactile device 222 may be incorporated into a single glove-like apparatus.

Figure 4:
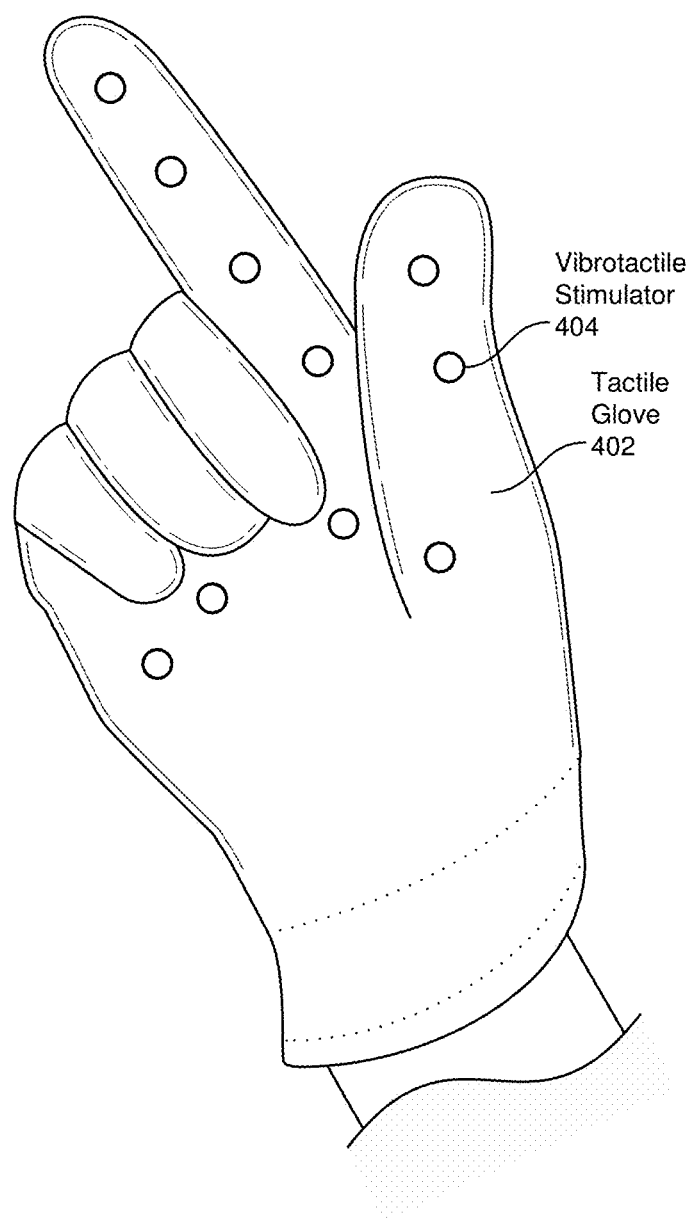
FIG. 4 is a graphical representation of an exemplary tactile glove for a user hand, where the tactile glove includes multiple vibrotactile stimulators.

FIG. 4 is a graphical representation of a tactile glove 402 (e.g., a type of vibrotactile device 222) being worn by a user as part of an artificial reality system (e.g., system 200). As depicted in FIG. 4, tactile glove 402 may include one or more vibrotactile stimulators 404. In some embodiments, other types of tactile components, such as those that apply consistent pressure to the user's hand, may also be incorporated into tactile glove 402, but are not depicted in FIG. 4. In some examples, vibrotactile stimulators 404 may be located at locations of tactile glove 402 at which contact between the user's hand and virtual objects may be expected to occur (e.g., on fingertips, along fingers, on the palm, and so). However, the locations of vibrotactile stimulators 404 may not be so limited in other embodiments.

Figure 5:
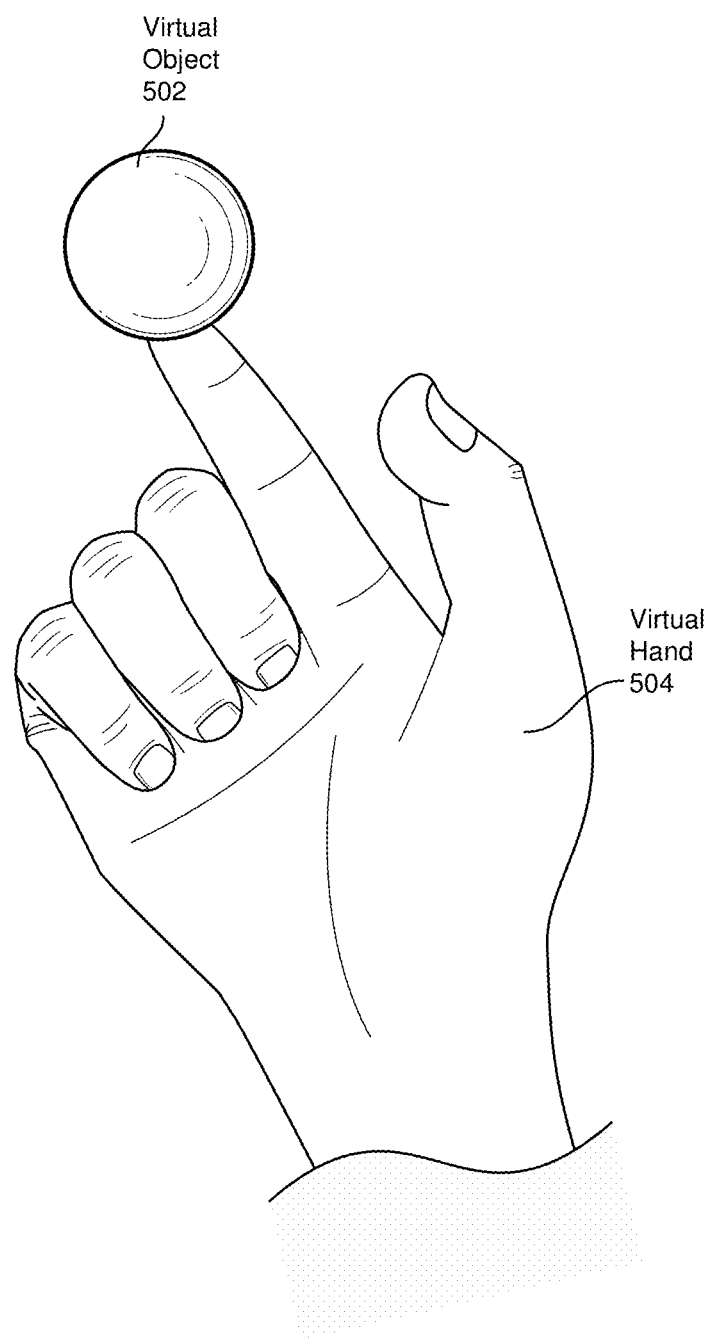
FIG. 5 is a graphical representation of the user hand of FIG. 4 in an artificial environment when contact with a virtual object is initiated.

FIG. 5 is a graphical representation of a user's virtual hand 504 within an artificial environment (e.g., representing the user's actual hand), as it may appear visually to the user (e.g., via visual display 224). In this example, the artificial environment includes a virtual object 502 (e.g., a small spheroid, such as a ping pong ball) at the tip of the index finger of virtual hand 504, with which virtual contact (e.g., contact in the artificial environment) has just been initiated. In addition to a visual cue of such contact being provided to the user using visual display 224 and/or a sound (e.g., a single tap) via speakers 226, a vibrotactile stimulator 404 at the index fingertip of tactile glove 402 may provide a vibrotactile signal (e.g., a vibration), as mentioned above, to provide a further cue to the user that contact with virtual object 502 has been initiated, possibly providing a strong sense of realism for the user within the artificial environment.

Figure 6:
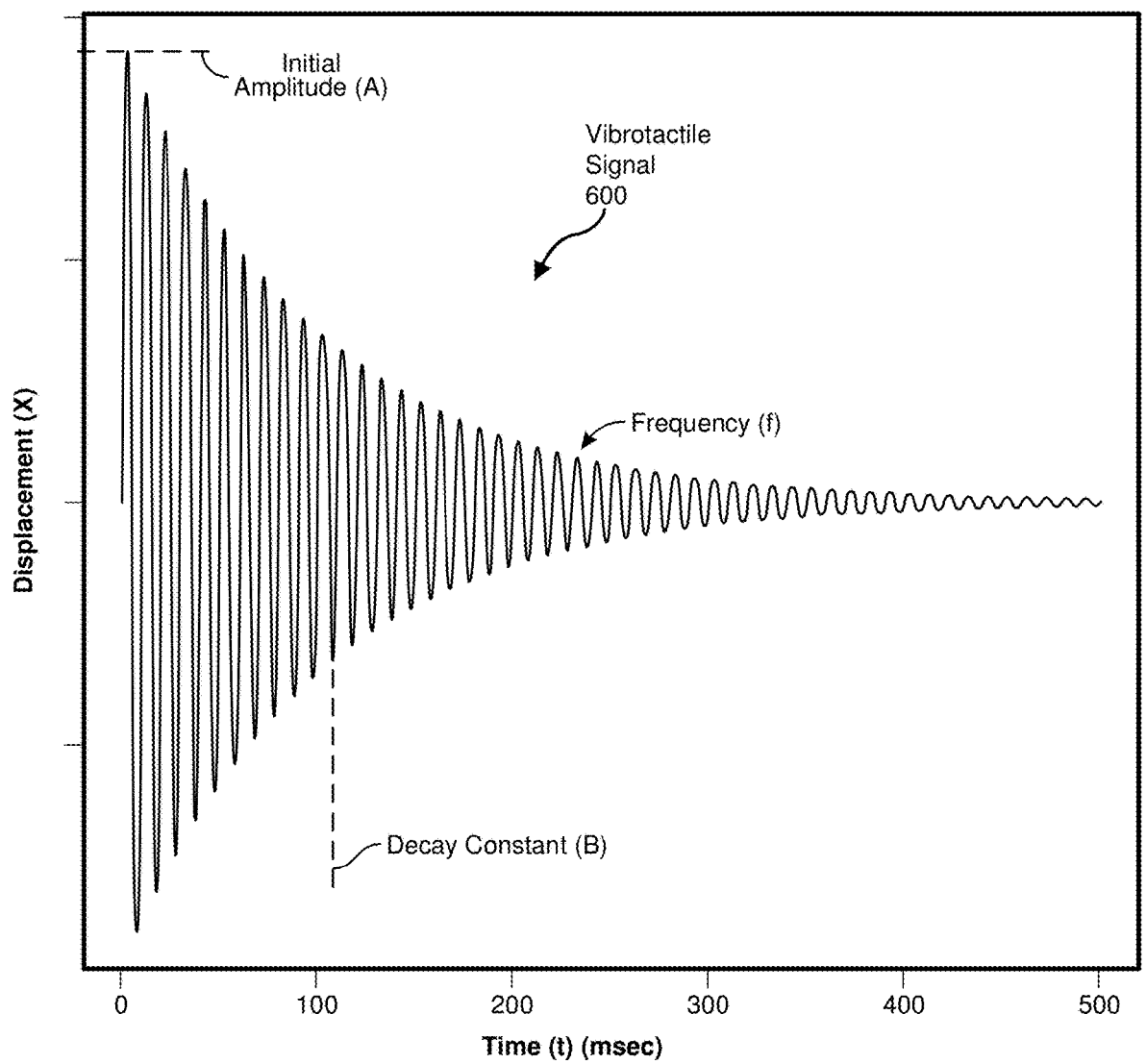
FIG. 6 is a graph of an exemplary vibrotactile signal produced by a vibrotactile stimulator.

FIG. 6 is a graph of an exemplary vibrotactile signal 600 produced by a vibrotactile stimulator (e.g., vibrotactile stimulator 404 of tactile glove 402), such as what may be expected when virtual contact is initiated between the user and a virtual object (e.g., virtual object 502). In some embodiments, vibrotactile signal 600 is a vibration embodied as a displacement along at least one direction (e.g., perpendicular or parallel to the skin of the user) that varies over time. In the example of FIG. 6, vibrotactile signal 600 is a sinusoidal signal that decays exponentially over time. However, in other embodiments, vibrotactile signal 600 may be a magnitude-varying signal that varies according to other types of waveforms (e.g., a triangular wave that decays geometrically over time, a square wave that decays linearly over time, and so on) that vary at a particular frequency, have an initial amplitude, and/or and exhibit an amplitude that decays at a particular rate.

In the particular example of FIG. 6, vibrotactile signal 600 may take the form $x=Ae^{-Bt}\sin(2\pi ft)$, where x is a physical displacement of vibrotactile stimulator 404 at a particular time t, A is an initial amplitude of vibrotactile signal 600, B is a decay constant for the exponential decay of vibrotactile signal 600, and f is a frequency of vibrotactile signal 600. In some examples, the decay constant B may be the reciprocal of the amount of time required for the magnitude of vibrotactile signal 600 to be reduced from its initial amplitude A by 1/e, or approximately 36.8 percent of A. Consequently, the higher the decay constant B, the faster or higher the rate of decay of vibrotactile signal 600. Further, in some examples, initial amplitude A may be on the order of some fraction of a millimeter; however, many other values of A may be utilized in various cases. In some embodiments, one or more of these parameters may be changed (e.g., by tactile rendering subsystem 206) based at least in part on the simulated rigidity of virtual object 502 with which virtual contact has been initiated.

In some embodiments, either or both the frequency or the decay rate of vibrotactile signal 600 may be based on the simulated rigidity of virtual object 502. For example, in some cases in which the decay rate is based on the simulated rigidity of virtual object 502, the decay rate and/or the decay constant may be positively related to the simulated rigidity (e.g., the more rigid the virtual object 502, the faster the decay rate, and the higher the decay constant). In some embodiments, the frequency of vibrotactile signal 600 may be related (e.g., positively related) to the simulated rigidity of virtual object 502, while in other examples, the frequency of vibrotactile signal 600 may be at least relatively constant regardless of the simulated rigidity.

In some embodiments, the initial amplitude of vibrotactile signal 600 may be based on a simulated intensity or strength of the virtual contact between virtual object 502 and the user. For example, the simulated intensity of the virtual contact may be based on a simulated relative speed between virtual object 502 and the user at the time of the virtual contact (e.g., higher relative speeds may result in a higher simulated intensity). Also, in some examples, the relative angle of approach between virtual object 502 and the user may affect the simulated intensity of the virtual contact (e.g., a "head-on" approach between virtual object 502 and the user may result in a higher simulated intensity than a "glancing blow"). Moreover, in some embodiments, the simulated intensity of the virtual contact may be based on a simulated weight of virtual object 502, such that a heavier virtual object 502 may result in a greater simulated intensity of the virtual contact than a lighter virtual object 502.

Moreover, in some examples, the one or more parameters of vibrotactile signal 600 also may be based on a simulated contact area at the location of the user at which the virtual contact with virtual object 502 is initiated. For instance, a change in frequency and/or decay rate of vibrotactile signal 600 may be perceived by the user as a change in the size of the simulated contact area.

In some embodiments, the one or more parameters of vibrotactile signal 600 may take into account any change of parameters or characteristics of a visual image (e.g., as presented by visual display 224 driven by visual rendering subsystem 208) and/or sound (e.g., as provided by speakers 226 driven by audio rendering subsystem 210) employed to render the initiation of contact between virtual object 502 and the user. For example, by portraying some level of softness in the appearance of virtual object 502 and/or a less pronounced sound associated with the virtual contact may enhance the user's perception of the rigidity of virtual object 502 as being less rigid, thus possibly affecting the one or more parameters of vibrotactile signal 600 that may result in an overall realistic experience for the user with respect to the virtual contact.

In some embodiments, the particular one or more parameters of vibrotactile signal 600 may be determined at least in part by the physical capabilities of vibrotactile stimulator 404. In other words, various frequencies, decay rates, and/or amplitudes for vibrotactile signal 600 may not be achievable using vibrotactile stimulator 404. Consequently, tactile rendering subsystem 208 may adjust the one or more parameters used to simulate the initial contact of the user with virtual object 502 in view of those limitations.

In some embodiments, the one or more parameters of vibrotactile signal 600 may also be determined based on a transfer function of vibrotactile stimulator 404 that relates an electrical input (e.g., a voltage, a current, a digital input, or the like) provided by tactile rendering subsystem 206 to the vibrotactile signal 600 being generated, which may describe the physical movement of vibrotactile stimulator 404. For example, to yield a particular vibrotactile signal 600 having specific values for the one or more parameters, tactile rendering subsystem 206 may take into account the transfer function to determine one or more characteristics of the electrical input needed to produce the desired vibrotactile signal 600.

Figure 7:
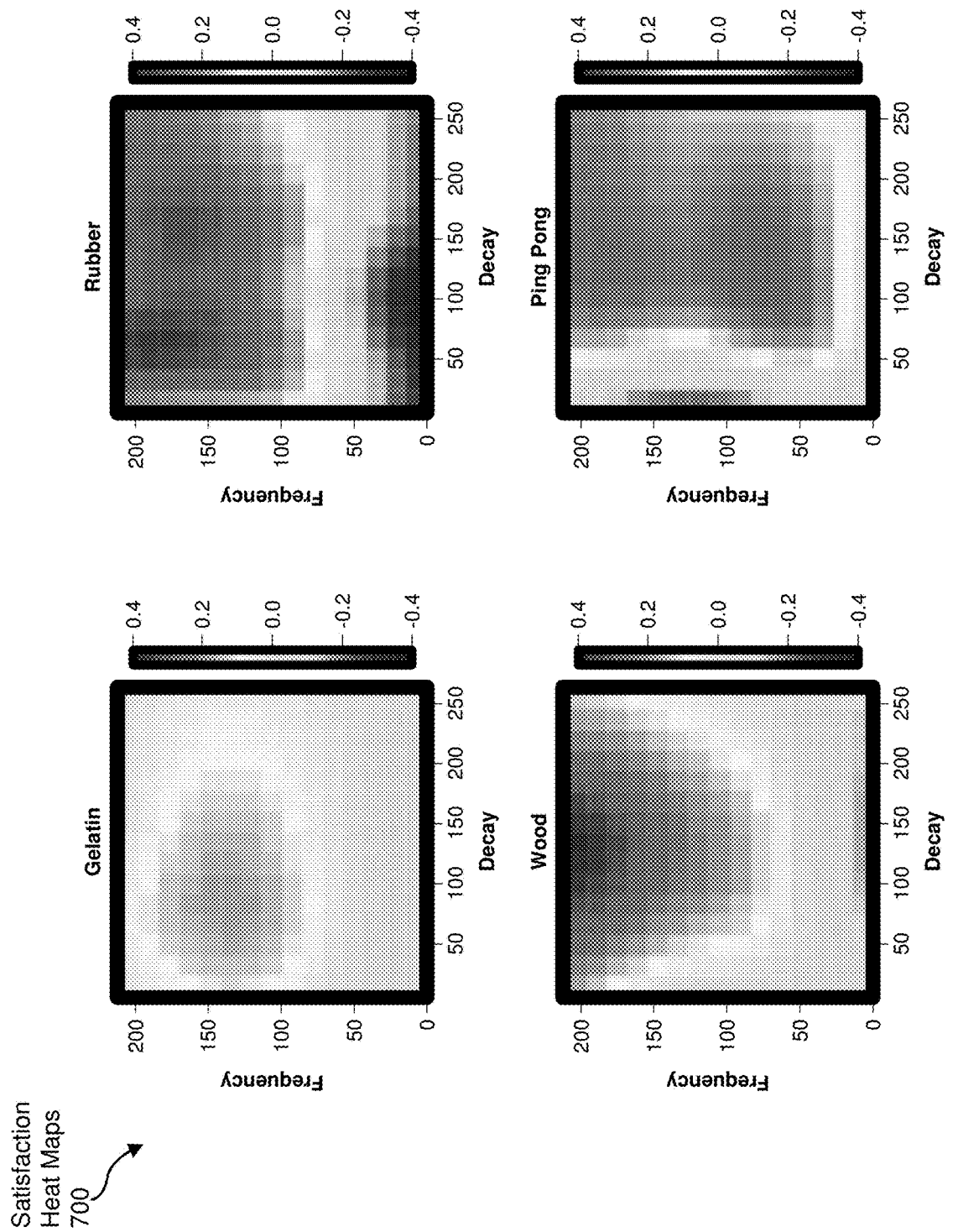
FIG. 7 are exemplary satisfaction heat maps indicating a level of realism for a user based on a frequency and a decay constant of the vibrotactile signal of FIG. 6 for a variety of virtual materials of a virtual object.

FIG. 7 provides exemplary satisfaction "heat maps" indicating a level of realism experienced by a user based on a frequency f and a decay constant B of vibrotactile signal 600 for a variety of virtual materials of a virtual object (e.g., virtual object 502). As illustrated in FIG. 7, the virtual materials represented are gelatin, rubber, wood, and the plastic of a ping pong ball. In some embodiments, each heat map may indicate a relative level of realism or satisfaction experienced for each combination of frequency (the graph vertical axis) and decay constant (the graph horizontal axis) for vibrotactile signal 600. In some examples, the level of realism or satisfaction experienced may be reported directly by the user during perceptual experiments in which a visual representation of the initiation of contact with virtual object 502 is shown to the user simultaneously with the presentation of the tactile sensation via vibrotactile signal 600 produced by vibrotactile stimulator 404. In such examples, the user may report the level of realism or satisfaction experienced based on how well the user's tactile experience matched the user's visual experience. Moreover, the initial magnitude A and the frequency f of vibrotactile signal 600 may be tuned in such experiments to provide a constant perceived intensity of tactile stimuli from the user's perspective, thereby providing the user with a more consistent reference frame by which to compare the various tactile experiences. Further, in some examples, multiple such users may engage in such an experiment, with their results combined and depicted in the heat maps of FIG. 7.

As illustrated in FIG. 7, in some examples, initiation of virtual contact with at least some rigid materials (e.g. wood) may be perceived as more realistic for decay constants of vibrotactile signal 600 in the range of 100-150 msec$^{-1}$. while less rigid or softer materials (e.g., gelatin or rubber) may be perceived as more realistic for decay constants in the relatively lower range of 50-100 msec$^{-1}$. Also, in some embodiments, frequencies of vibrotactile signal 600 may be more realistic for softer materials in the 75-150 Hertz (Hz) range, and more realistic for harder materials in the 150-200 Hz range. In yet other examples, the frequency of vibrotactile signal 600 may be held constant in the 150-200 Hz range across objects of most or all levels of rigidity, especially when the delay constant is based on the rigidity of virtual object 502, as described above.

As discussed above in conjunction with FIGS. 1-7, tactile simulation of initial contact of a user with a virtual object (e.g., within the context of an artificial reality system) that bases one or more parameters of a vibrotactile signal applied to a user on a simulated rigidity of the virtual object may enhance the realism or "immersion" of the user's experience within a presented artificial environment. In at least some examples, the combination of a visual presentation representing the initial contact with such tactile stimulation may help provide a consistently realistic user experience, particularly when the user interacts with virtual objects representing a range of rigidity within the artificial environment.

EXAMPLE EMBODIMENTS

Example 1

A computer-implemented method for tactile simulation of initial contact with a virtual object may include (1) presenting, using a vibrotactile stimulator and a visual display, an artificial environment to a user, (2) determining whether a virtual contact is being initiated between a virtual object in the artificial environment and a surface location of the user served by the vibrotactile stimulator, and (3) actuating, in response to determining that a virtual contact is being initiated between the virtual object and the surface location, the vibrotactile stimulator to generate a vibrotactile signal to simulate the initiation of the virtual contact at the surface location, where (a) the vibrotactile signal includes a magnitude-varying signal, and (b) at least one parameter of the magnitude-varying signal is based on a simulated rigidity of the virtual object as presented by the visual display.

Example 2

The computer-implemented method of Example 1, where the vibrotactile signal includes a sinusoidal signal that decays over time.

Example 3

The computer-implemented method of Example 1 or Example 2, where the vibrotactile signal includes a signal of a form $x=Ae^{-Bt} \sin(2\pi ft)$, and where x is a physical displacement of the vibrotactile stimulator, A is an initial amplitude of the vibrotactile signal, B is a decay constant of the vibrotactile signal, f is a frequency of the vibrotactile signal, and t is time.

Example 4

The computer-implemented method of Example 1 or Example 2, where a decay rate of the vibrotactile signal is based on the simulated rigidity of the virtual object.

Example 5

The computer-implemented method of Example 4, where the decay rate of the vibrotactile signal is positively related to the simulated rigidity of the virtual object.

Example 6

The computer-implemented method of Example 1 or Example 2, where a frequency of the vibrotactile signal is constant relative to the simulated rigidity of the virtual object.

Example 7

The computer-implemented method of Example 1 or Example 2, where a frequency of the vibrotactile signal is based on the simulated rigidity of the virtual object.

Example 8

The computer-implemented method of Example 7, where the frequency of the vibrotactile signal is positively related to the simulated rigidity of the virtual object.

Example 9

The computer-implemented method of Example 1 or Example 2, where an initial amplitude of the vibrotactile signal is based on a simulated intensity of the virtual contact being initiated between the virtual object and the surface location.

Example 10

The computer-implemented method of Example 9, where the simulated intensity of the virtual contact is based on a simulated relative speed between the virtual object and the surface location.

Example 11

The computer-implemented method of Example 9, where the simulated intensity of the virtual contact is based on a simulated weight of the virtual object.

Example 12

The computer-implemented method of Example 1 or Example 2, where the at least one parameter of the magnitude-varying signal is further based on a transfer function of the vibrotactile stimulator relating an electrical input of the vibrotactile stimulator to a physical movement of the vibrotactile stimulator.

Example 13

The computer-implemented method of Example 1 or Example 2, where the at least one parameter of the magnitude-varying signal is further based on a simulated contact area at the surface location as presented by the visual display.

Example 14

A system for tactile simulation of initial contact with a virtual object may include (1) a visual display, (2) a vibrotactile stimulator, (3) at least one physical processor, and (4) physical memory including computer-executable instructions that, when executed by the physical processor, cause the physical processor to perform operations including (a) presenting, using the vibrotactile stimulator and the visual display, an artificial environment to a user, (b) determining whether a virtual contact is being initiated between a virtual object in the artificial environment and a surface location of the user served by the vibrotactile stimulator, and (c) actuating, in response to determining that a virtual contact is being initiated between the virtual object and the surface location, the vibrotactile stimulator to generate a vibrotactile signal to simulate the initiation of the virtual contact at the surface location, where (i) the vibrotactile signal includes a magnitude-varying signal, and (ii) at least one parameter of the magnitude-varying signal is based on a simulated rigidity of the virtual object as presented by the visual display.

Example 15

The system of Example 14, where (1) the system may further include a tactile glove configured to be worn on a hand of a user, and (2) the tactile glove may include the vibrotactile stimulator.

Example 16

The system of Example 15, where (1) the surface location may be a fingertip of a user, and (2) the vibrotactile stimulator may be located on the tactile glove at a position corresponding to the fingertip of the user.

Example 17

The system of either Example 15 or Example 16, where (1) the tactile glove may further include at least one positional sensor component, and (2) determining whether the virtual contact is being initiated between the virtual object in the artificial environment at the surface location may be based on a location of the at least one positional sensor component.

Example 18

The system of either Example 15 or Example 16, where (1) the system may further include a camera that detects a position of the tactile glove, and (2) determining whether the virtual contact is being initiated between the virtual object in the artificial environment at the surface location may be based on the position of the tactile glove as detected by the camera.

Example 19

The system of any of Examples 14-16, where (1) the magnitude-varying signal may include a sinusoidal signal that decays exponentially over time, and (2) the at least one parameter of the magnitude-varying signal may include a decay constant of the magnitude-varying signal.

Example 20

A non-transitory computer-readable medium including one or more computer-executable instructions that, when executed by at least one processor of a computing device, may cause the computing device to (1) present, using a vibrotactile stimulator and a visual display, an artificial environment to a user, (2) determine whether a virtual contact is being initiated between a virtual object in the artificial environment and a surface location of the user served by the vibrotactile stimulator, and (3) actuate, in response to determining that a virtual contact is being initiated between the virtual object and the surface location, the vibrotactile stimulator to generate a vibrotactile signal to simulate the initiation of the virtual contact at the surface location, where (a) the vibrotactile signal includes a magnitude-varying signal, and (b) at least one parameter of the magnitude-varying signal is based on a simulated rigidity of the virtual object as presented by the visual display.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 800 in FIG. 8. Other artificial reality systems may include a NED that also provides visibility into the real world (e.g., AR system 900 in FIG. 9) or that visually immerses a user in an artificial reality (e.g., VR system 1000 in FIG. 10). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 8:
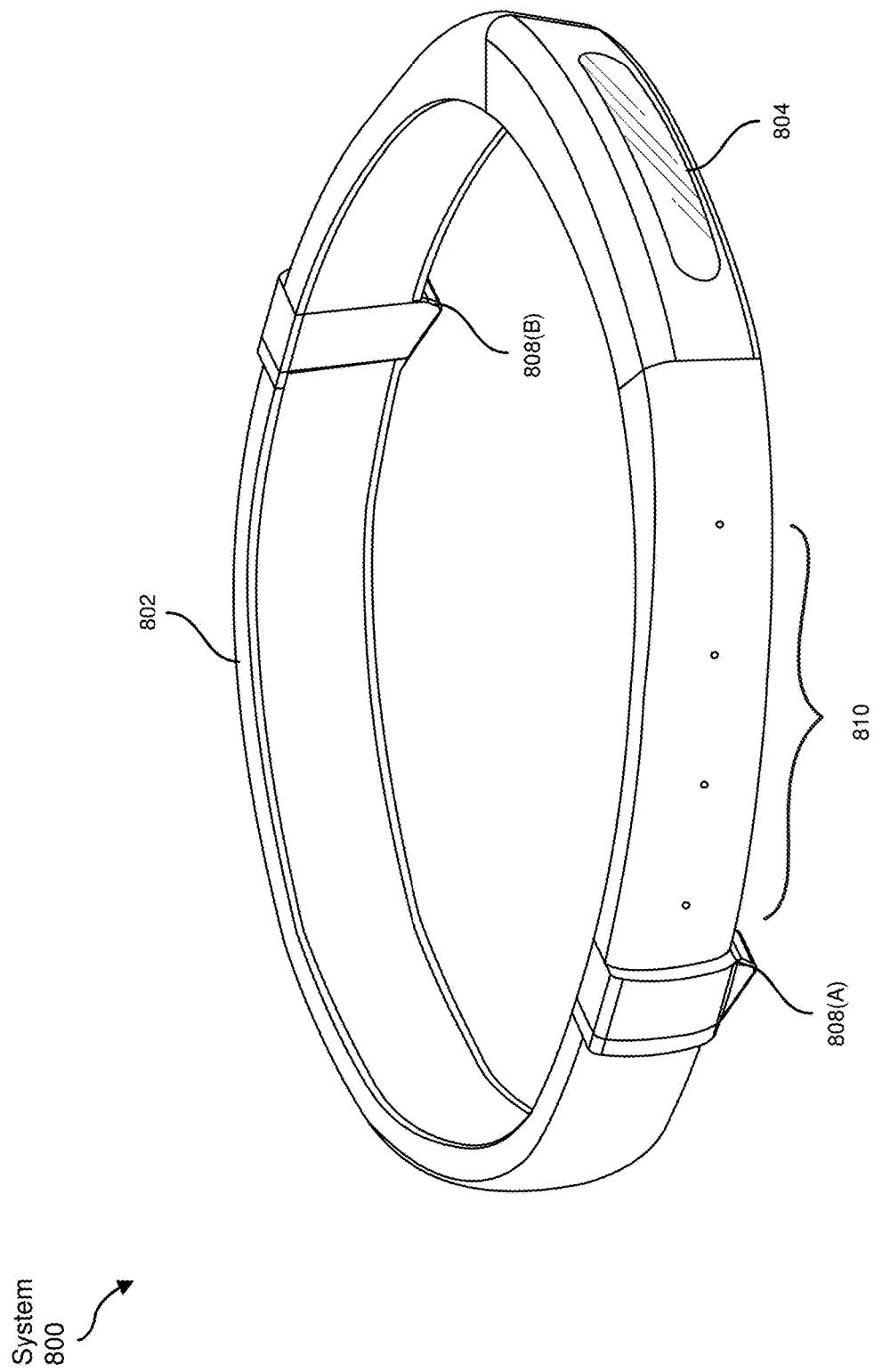
FIG. 8 is a perspective view of an exemplary augmented reality system that may employ various methods disclosed herein.

Turning to FIG. 8, AR system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. AR system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, AR system 800 may not necessarily include a NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 800 may not include a NED, AR system 800 may include other types of screens or visual feedback devices (e.g., a display screen integrated into a side of frame 802).

Figure 9:
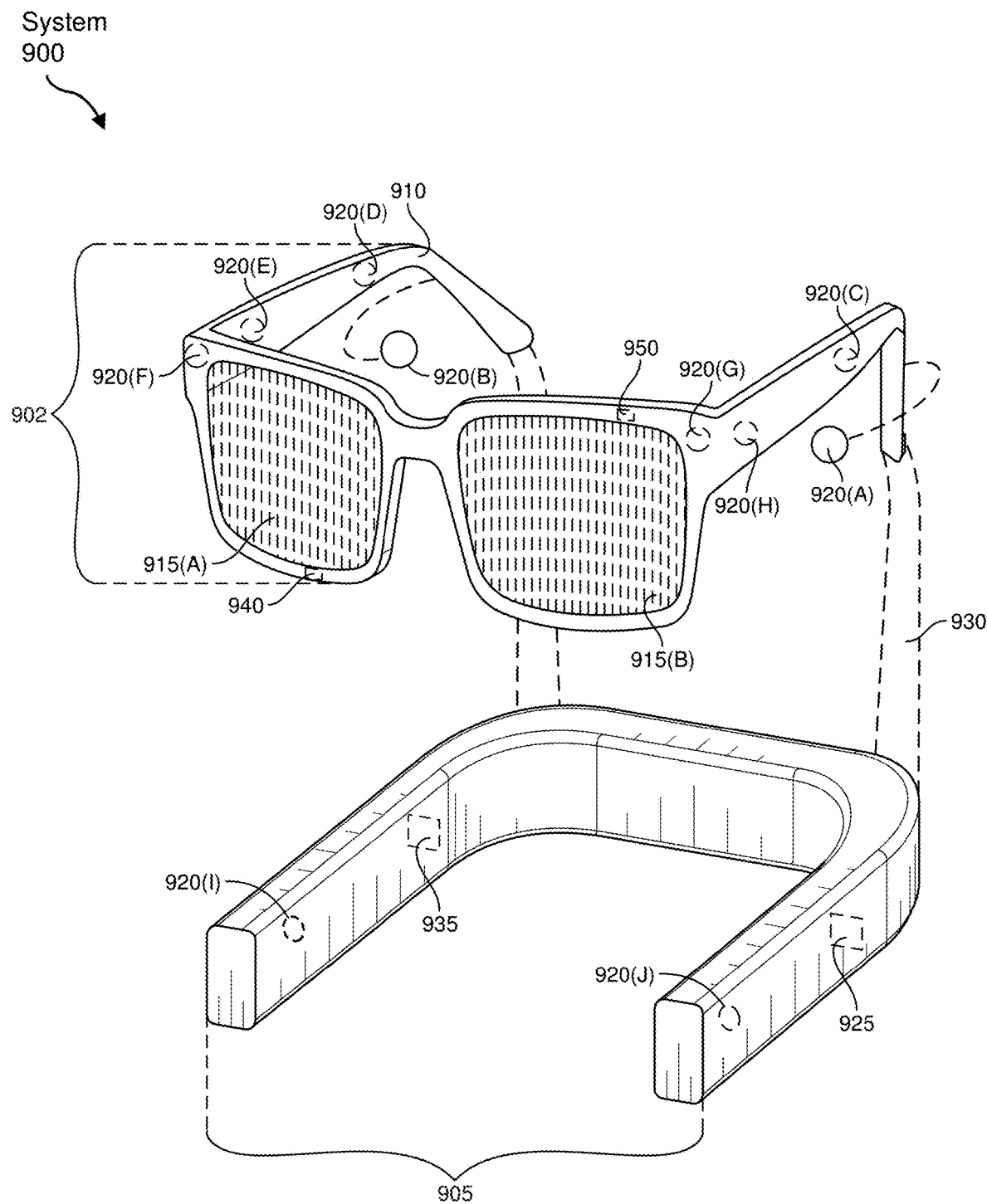
FIG. 9 is a perspective view of another exemplary augmented reality system that may employ various methods disclosed herein.

The embodiments discussed in this disclosure may also be implemented in AR systems that include one or more NEDs. For example, as shown in FIG. 9, AR system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While AR system 900 includes two displays, embodiments of this disclosure may be implemented in AR systems with a single NED or more than two NEDs.

In some embodiments, AR system 900 may include one or more sensors, such as sensor 940. Sensor 940 may generate measurement signals in response to motion of AR system 900 and may be located on substantially any portion of frame 910. Sensor 940 may include a position sensor, an inertial measurement unit (IMU), a depth camera assembly, or any combination thereof. In some embodiments, AR system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

AR system 900 may also include a microphone array with a plurality of acoustic sensors 920(A)-920(J), referred to collectively as acoustic sensors 920. Acoustic sensors 920 may be transducers that detect air pressure variations induced by sound waves. Each acoustic sensor 920 may be configured to detect sound and convert the detected sound into an electronic format (e.g., an analog or digital format). The microphone array in FIG. 9 may include, for example, ten acoustic sensors: 920(A) and 920(B), which may be designed to be placed inside a corresponding ear of the user, acoustic sensors 920(C), 920(D), 920(E), 920(F), 920(G), and 920(H), which may be positioned at various locations on frame 910, and/or acoustic sensors 920(I) and 920(J), which may be positioned on a corresponding neckband 905.

The configuration of acoustic sensors 920 of the microphone array may vary. While AR system 900 is shown in FIG. 9 as having ten acoustic sensors 920, the number of acoustic sensors 920 may be greater or less than ten. In some embodiments, using higher numbers of acoustic sensors 920 may increase the amount of audio information collected and/or the sensitivity and accuracy of the audio information. In contrast, using a lower number of acoustic sensors 920 may decrease the computing power required by the controller 950 to process the collected audio information. In addition, the position of each acoustic sensor 920 of the microphone array may vary. For example, the position of an acoustic sensor 920 may include a defined position on the user, a defined coordinate on the frame 910, an orientation associated with each acoustic sensor, or some combination thereof.

Acoustic sensors 920(A) and 920(B) may be positioned on different parts of the user's ear, such as behind the pinna or within the auricle or fossa. Or, there may be additional acoustic sensors on or surrounding the ear in addition to acoustic sensors 920 inside the ear canal. Having an acoustic sensor positioned next to an ear canal of a user may enable the microphone array to collect information on how sounds arrive at the ear canal. By positioning at least two of acoustic sensors 920 on either side of a user's head (e.g., as binaural microphones), AR device 900 may simulate binaural hearing and capture a 3D stereo sound field around about a user's head. In some embodiments, acoustic sensors 920(A) and 920(B) may be connected to AR system 900 via a wired connection, and in other embodiments, the acoustic sensors 920(A) and 920(B) may be connected to AR system 900 via a wireless connection (e.g., a Bluetooth connection). In still other embodiments, acoustic sensors 920(A) and 920(B) may not be used at all in conjunction with AR system 900.

Acoustic sensors 920 on frame 910 may be positioned along the length of the temples, across the bridge, above or below display devices 915(A) and 915(B), or some combination thereof. Acoustic sensors 920 may be oriented such that the microphone array is able to detect sounds in a wide range of directions surrounding the user wearing the AR system 900. In some embodiments, an optimization process may be performed during manufacturing of AR system 900 to determine relative positioning of each acoustic sensor 920 in the microphone array.

AR system 900 may further include or be connected to an external device (e.g., a paired device), such as neckband 905. As shown, neckband 905 may be coupled to eyewear device 902 via one or more connectors 930. Connectors 930 may be wired or wireless connectors and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof. Furthermore, neckband 905 generally represents any type or form of paired device. Thus, the following discussion of neckband 905 may also apply to various other paired devices, such as smart watches, smart phones, wrist bands, other wearable devices, hand-held controllers, tablet computers, laptop computers, etc.

Pairing external devices, such as neckband 905, with AR eyewear devices may enable the eyewear devices to achieve the form factor of a pair of glasses while still providing sufficient battery and computation power for expanded capabilities. Some or all of the battery power, computational resources, and/or additional features of AR system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 905 may be communicatively coupled with eyewear device 902 and/or to other devices. The other devices may provide certain functions (e.g., tracking, localizing, depth mapping, processing, storage, etc.) to AR system 900. In the embodiment of FIG. 9, neckband 905 may include two acoustic sensors (e.g., 920(I) and 920(J)) that are part of the microphone array (or potentially form their own microphone subarray). Neckband 905 may also include a controller 925 and a power source 935.

Acoustic sensors 920(I) and 920(J) of neckband 905 may be configured to detect sound and convert the detected sound into an electronic format (analog or digital). In the embodiment of FIG. 9, acoustic sensors 920(I) and 920(J) may be positioned on neckband 905, thereby increasing the distance between the neckband acoustic sensors 920(I) and 920(J) and other acoustic sensors 920 positioned on eyewear device 902. In some cases, increasing the distance between acoustic sensors 920 of the microphone array may improve the accuracy of beamforming performed via the microphone array. For example, if a sound is detected by acoustic sensors 920(C) and 920(D) and the distance between acoustic sensors 920(C) and 920(D) is greater than, e.g., the distance between acoustic sensors 920(D) and 920(E), the determined source location of the detected sound may be more accurate than if the sound had been detected by acoustic sensors 920(D) and 920(E).

Controller 925 of neckband 905 may process information generated by the sensors on neckband 905 and/or AR system 900. For example, controller 925 may process information from the microphone array that describes sounds detected by the microphone array. For each detected sound, controller 925 may perform a direction of arrival (DoA) estimation to estimate a direction from which the detected sound arrived at the microphone array. As the microphone array detects sounds, controller 925 may populate an audio data set with the information. In embodiments in which AR system 900 includes an inertial measurement unit (IMU), controller 925 may compute all inertial and spatial calculations from the IMU located on eyewear device 902. Connector 930 may convey information between AR system 900 and neckband 905 and between AR system 900 and controller 925. The information may be in the form of optical data, electrical data, wireless data, or any other transmittable data form. Moving the processing of information generated by AR system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as VR system 1000 in FIG. 10, that mostly or completely covers a user's field of view. VR system 1000 may include a front rigid body 1002 and a band 1004 shaped to fit around a user's head. VR system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 900 and/or VR system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 900 and/or VR system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 800, AR system 900, and/or VR system 1000 may include one or more optical sensors such as two-dimensional (2D) or three-dimensional (3D) cameras, time-of-flight depth sensors, single-beam or sweeping laser rangefinders, 3D LiDAR (light detection and ranging) sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

Figure 10:
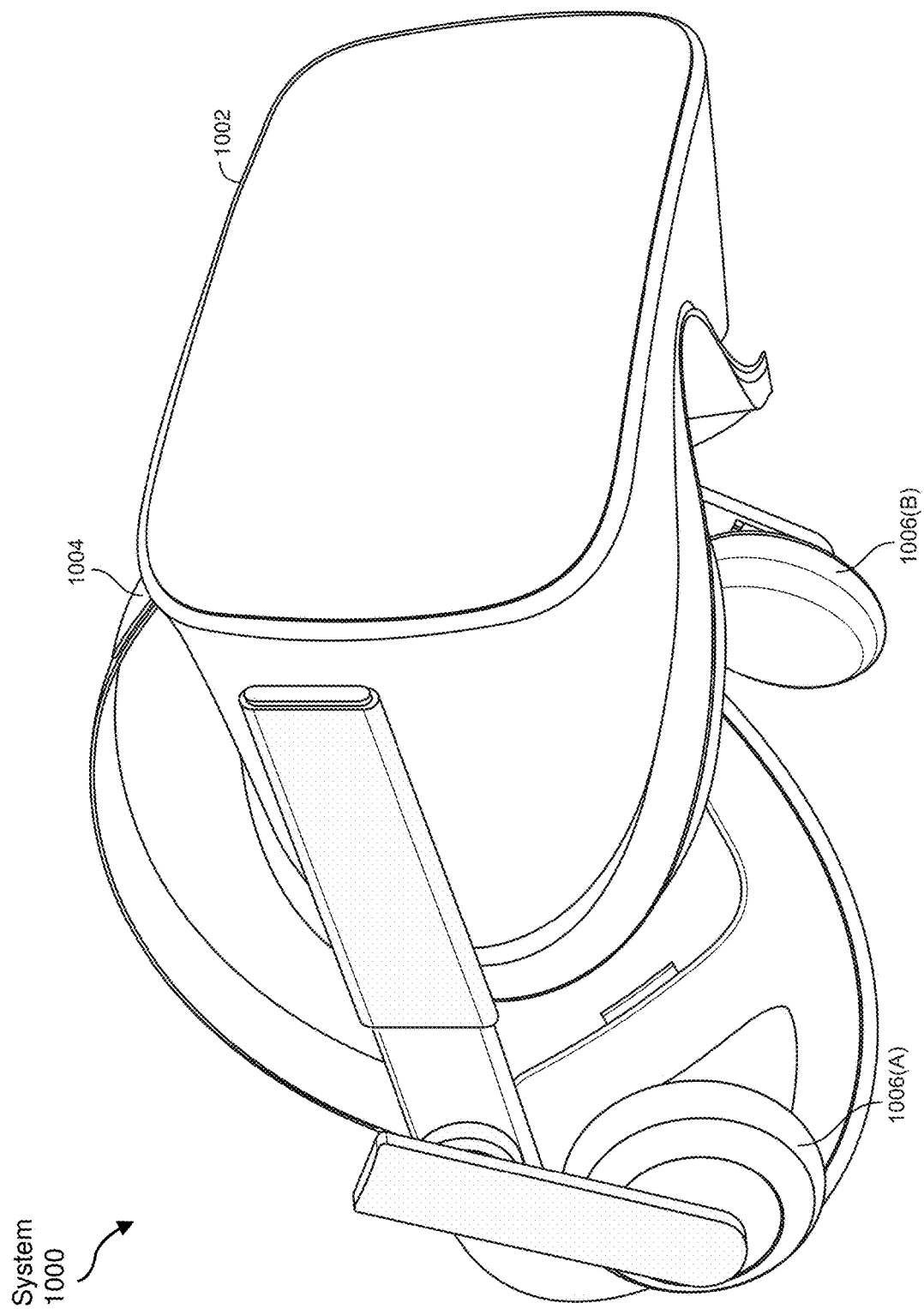
FIG. 10 is a perspective view of an exemplary virtual reality system that may employ various methods disclosed herein.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data indicating the positions of a user and a virtual object in an artificial environment (e.g., based in part on a location and/or position of the user in the real world), determining whether that data indicates initiation of virtual contact (e.g., in the artificial environment) between the virtual object and the user, and indicate such contact to the user (e.g., via a vibrotactile stimulator and a visual display). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   presenting, using a visual display, an artificial environment to a user;
   determining whether a virtual contact is being initiated between a virtual object in the artificial environment and a surface location of the user served by a vibrotactile stimulator coupled to the user; and
   actuating, in response to determining that a virtual contact is being initiated between the virtual object and the surface location, the vibrotactile stimulator to generate a vibrotactile signal to simulate the initiation of the virtual contact at the surface location, wherein:
   the vibrotactile signal comprises a magnitude-varying signal having a decay rate that is positively related to a simulated rigidity of the virtual object as presented by the visual display.

2. The computer-implemented method of claim 1, wherein the vibrotactile signal comprises a sinusoidal signal that decays over time according to the decay rate.

3. The computer-implemented method of claim 2, wherein the vibrotactile signal comprises a signal of a form $x = Ae^{-Bt} \sin(2\pi ft)$, and wherein:
   x is a physical displacement of the vibrotactile stimulator;
   A is an initial amplitude of the vibrotactile signal;
   B is a decay constant of the vibrotactile signal;
   f is a frequency of the vibrotactile signal; and
   t is time.

4. The computer-implemented method of claim 1, wherein a frequency of the vibrotactile signal is constant relative to the simulated rigidity of the virtual object.

5. The computer-implemented method of claim 1, wherein a frequency of the vibrotactile signal is based on the simulated rigidity of the virtual object.

6. The computer-implemented method of claim 5, wherein the frequency of the vibrotactile signal is positively related to the simulated rigidity of the virtual object.

7. The computer-implemented method of claim 1, wherein:
   an initial amplitude of the vibrotactile signal is based on a simulated intensity of the virtual contact being initiated between the virtual object and the surface location.

8. The computer-implemented method of claim 7, wherein the simulated intensity of the virtual contact is based on a simulated relative speed between the virtual object and the surface location.

9. The computer-implemented method of claim 7, wherein the simulated intensity of the virtual contact is based on a simulated weight of the virtual object.

10. The computer-implemented method of claim 1, wherein at least one parameter of the magnitude-varying signal is based on a transfer function of the vibrotactile stimulator relating an electrical input of the vibrotactile stimulator to a physical movement of the vibrotactile stimulator.

11. The computer-implemented method of claim 1, wherein at least one parameter of the magnitude-varying signal is based on a simulated contact area at the surface location as presented by the visual display.

12. A system comprising:
    a visual display;
    a vibrotactile stimulator;
    at least one physical processor; and
    physical memory comprising computer-executable instructions that, when executed by the physical processor, cause the physical processor to perform operations comprising:
    presenting, using the visual display, an artificial environment to a user;
    determining whether a virtual contact is being initiated between a virtual object in the artificial environment and a surface location of the user served by the vibrotactile stimulator; and
    actuating, in response to determining that a virtual contact is being initiated between the virtual object and the surface location, the vibrotactile stimulator to generate a vibrotactile signal to simulate the initiation of the virtual contact at the surface location, wherein:
    the vibrotactile signal comprises a magnitude-varying signal
    having a decay rate that is positively related to a simulated rigidity of the virtual object as presented by the visual display.

13. The system of claim 12, wherein the system further comprises:
    a tactile glove configured to be worn on a hand of the user, wherein the tactile glove comprises the vibrotactile stimulator.

14. The system of claim 13, wherein:
    the surface location is a fingertip of the user; and
    the vibrotactile stimulator is located on the tactile glove at a position corresponding to the fingertip of the user.

15. The system of claim 13, wherein:
    the tactile glove further comprises at least one positional sensor component; and
    determining whether the virtual contact is being initiated between the virtual object in the artificial environment at the surface location is based on a location of the at least one positional sensor component.

16. The system of claim 13, wherein:
    the system further comprises a camera that detects a position of the tactile glove; and
    determining whether the virtual contact is being initiated between the virtual object in the artificial environment at the surface location is based on the position of the tactile glove as detected by the camera.

17. The system of claim 12, wherein:
the magnitude-varying signal comprises a sinusoidal signal that decays exponentially over time according to the decay rate.

18. A non-transitory computer-readable medium comprising one or more computer-executable instructions that, when executed by at least one processor of a computing device, cause the computing device to:
present, using a visual display, an artificial environment to a user;
determine whether a virtual contact is being initiated between a virtual object in the artificial environment and a surface location of the user served by a vibrotactile stimulator coupled to the user; and
actuate, in response to determining that a virtual contact is being initiated between the virtual object and the surface location, the vibrotactile stimulator to generate a vibrotactile signal to simulate the initiation of the virtual contact at the surface location, wherein:
the vibrotactile signal comprises a magnitude-varying signal
having a decay rate that is positively related to a simulated rigidity of the virtual object as presented by the visual display.

19. The computer-implemented method of claim 7, wherein the simulated intensity of the virtual contact is based on a simulated relative angle of approach between the virtual object and the surface location.

20. The computer-implemented method of claim 19, wherein the simulated intensity of the virtual contact is positively related to the simulated relative angle of approach.

* * * * *